US011908642B2

(12) United States Patent
Pruessing et al.

(10) Patent No.: US 11,908,642 B2
(45) Date of Patent: Feb. 20, 2024

(54) DRIVE SYSTEM FOR A SWITCH, AND METHOD FOR DRIVING A SWITCH

(71) Applicant: Maschinenfabrik Reinhausen GmbH, Regensburg (DE)

(72) Inventors: Kathrin Pruessing, Regensburg (DE); Michael Schmeisser, Regensburg (DE); Juergen Schimbera, Regensburg (DE); Eduard Zerr, Regensburg (DE); Sebastian Schmid, Sinzing (DE); Klaus Ixmeier, Thumhausen (DE); Benjamin Dittmann, Neutraubling (DE); Eugen Nagel, Regensburg (DE); Franz Habenschaden, Heitzenhofen (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 105 days.

(21) Appl. No.: 17/610,725

(22) PCT Filed: Apr. 23, 2020

(86) PCT No.: PCT/EP2020/061293
§ 371 (c)(1),
(2) Date: Nov. 12, 2021

(87) PCT Pub. No.: WO2020/229130
PCT Pub. Date: Nov. 19, 2020

(65) Prior Publication Data

US 2022/0223356 A1 Jul. 14, 2022

(30) Foreign Application Priority Data

May 15, 2019 (DE) ..................... 10 2019 112 716.5

(51) Int. Cl.
*H01H 3/26* (2006.01)
*H01H 3/40* (2006.01)

(52) U.S. Cl.
CPC ................ *H01H 3/26* (2013.01); *H01H 3/40* (2013.01); *H01H 2003/266* (2013.01)

(58) Field of Classification Search
CPC ...... H01H 3/26; H01H 3/40; H01H 2003/266; H02P 13/06; H01F 29/04
(Continued)

(56) References Cited

U.S. PATENT DOCUMENTS 7,109,670 B1 * 9/2006 Rehm .................. G05B 19/416 318/610
2015/0061806 A1 * 3/2015 Teising .............. H01H 33/6661 336/150

FOREIGN PATENT DOCUMENTS

WO WO 0036621 A1 6/2000
WO WO 2008024048 A1 2/2008
WO WO 2012135209 A1 10/2012

* cited by examiner

*Primary Examiner* — Renee S Luebke
*Assistant Examiner* — Iman Malakooti
(74) *Attorney, Agent, or Firm* — LEYDIG, VOIT & MAYER, LTD.

(57) ABSTRACT

A drive system drives a switch. The drive system includes: a drive shaft connecting the drive system to the switch; a motor configured to drive the drive shaft; a feedback system; and a controller. The feedback system is configured to: determine at least one value for a position of the drive shaft; and generate a feedback signal based on the at least one value. The controller acts on an operation of the motor depending on the feedback signal.

9 Claims, 2 Drawing Sheets

(58) Field of Classification Search
USPC ..................................... 200/400; 318/400.36
See application file for complete search history.

DRIVE SYSTEM FOR A SWITCH, AND METHOD FOR DRIVING A SWITCH

CROSS REFERENCE TO RELATED APPLICATIONS

This application is a U.S. National Phase application under 35 U.S.C. § 371 of International Application No. PCT/EP2020/061293, filed on Apr. 23, 2020, and claims benefit to German Patent Application No. DE 10 2019 112 716.5, filed on May 15, 2019. The International Application was published in German on Nov. 19, 2020 as WO 2020/229130 A1 under PCT Article 21(2).

FIELD

The present invention relates to a drive system for a switch and to a method for driving a switch.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches or disconnecting switches.

For example, on-load tap-changers are used for uninterrupted switchover between different winding taps of an item of electrical equipment, such as a power transformer or a controllable reactor. For example, this makes it possible for the transmission ratio of the transformer or the inductance of the reactor to be changed. Double reversing change-over selectors are used to reverse the polarity of windings during power transformer operation.

All of these switches are highly safety-relevant components of the electrical equipment. The switchover occurs whilst the equipment is in operation, and accordingly connected, for example, to a power network. In extreme cases, malfunctions during operation can have serious technical and economic consequences.

SUMMARY

In an embodiment, the present disclosure provides a drive system drives a switch. The drive system includes: a drive shaft connecting the drive system to the switch; a motor configured to drive the drive shaft; a feedback system; and a controller. The feedback system is configured to: determine at least one value for a position of the drive shaft; and generate a feedback signal based on the at least one value. The controller acts on an operation of the motor depending on the feedback signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
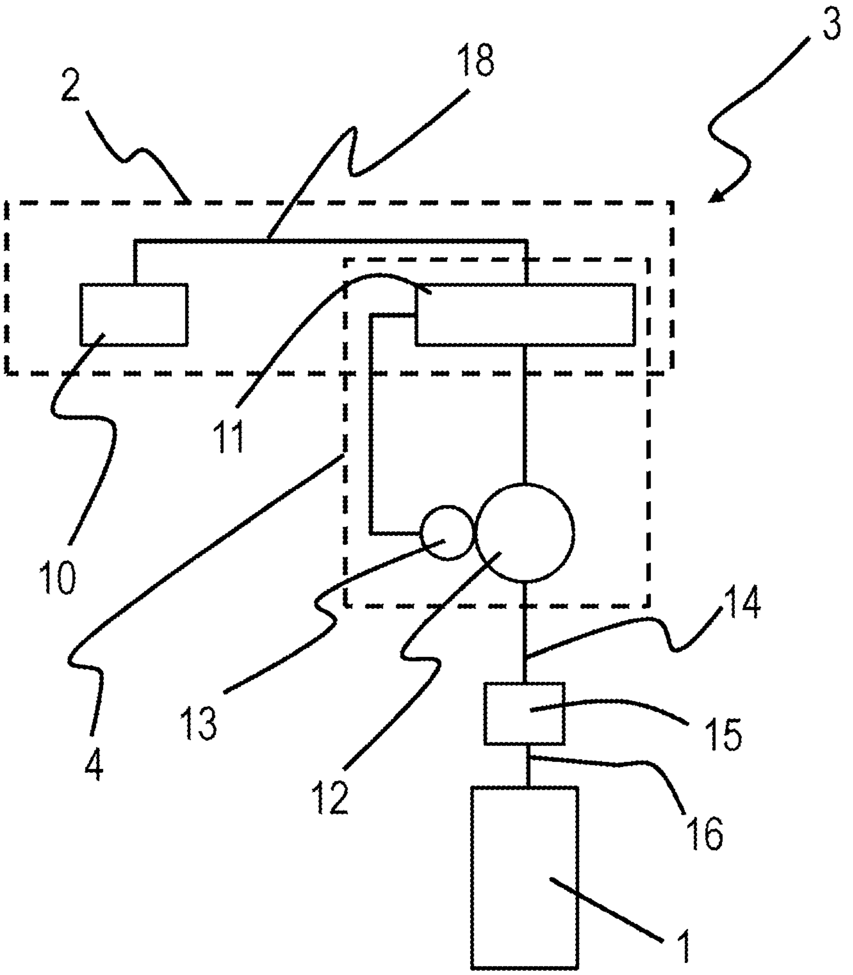
FIG. 1 a schematic representation of an exemplary embodiment of a drive system according to the improved concept.

Embodiments of the present invention provide an improved concept for driving a switch, by means of which concept the operational reliability is increased.

Embodiments of the invention provide a method for driving at least one switch, which method provides an improved concept for driving a switch, by means of which concept the flexibility of the drive and the reliability during the switching are increased.

Aspects of the present disclosure are based on the concept of equipping a drive shaft for driving the switch with a feedback system, which is able to detect at least one value for a position of the drive shaft. The operation of the motor is influenced based on a feedback signal which is generated depending on the value.

According to aspects of the present disclosure, a drive system for the switch is provided. The drive system has a drive shaft connecting the drive system to the switch, a motor for driving the drive shaft, and a feedback system. The feedback system is configured to determine at least one value for a position of the drive shaft and to generate a feedback signal based on the at least one value. In addition, the drive system has a control device, which is configured to act on the operation of the motor depending on the feedback signal.

According to at least one embodiment, the switch can be configured as an on-load tap-changer, or a diverter switch, or a selector, or a double reversing change-over selector, or a reversing change-over selector, or a change-over selector, or a circuit breaker, or an on-load switch or a disconnecting switch.

The expression "values for the position of the drive shaft" also includes those values of measurement variables from which the position of the drive shaft can be unambiguously determined, if necessary within a tolerance range.

By determining at least one value for the position of the drive shaft, the control device can increase the reliability of the position determination and reduce the corresponding residual risk of an incorrect position determination.

According to at least one embodiment, the drive system is used to drive a shaft of the switch, for example, the on-load tap-changer or a corresponding component of the on-load tap-changer. This causes the on-load tap-changer, for example, to carry out one or more operations, for example, a switchover between two winding taps of an item of equipment or parts of the switchover, such as a diverter switch operation, a selector actuation, a change-over selector actuation, or a double reversing change-over selection actuation.

According to at least one embodiment, the drive shaft is connected directly or indirectly, in particular via one or more gear units, to the switch, in particular to the shaft of the switch.

According to at least one embodiment, the drive shaft is connected directly or indirectly, in particular via one or more gear units, to the diverter switch, selector, double reversing change-over selector, reversing change-over selector, circuit breaker, on-load switch or disconnecting switch, in particular to the shaft of the diverter switch, selector, double reversing change-over selector, reversing change-over selector, circuit breaker, on-load switch or disconnecting switch.

According to at least one embodiment, the drive shaft is connected directly or indirectly, in particular via one or more gear units, to the motor, in particular to a motor shaft of the motor.

According to at least one embodiment, a position, in particular an absolute position, of the motor shaft corresponds to a position, in particular an absolute position, of the drive shaft. This means that the position of the drive shaft can be unambiguously deduced from the position of the motor shaft, if necessary within a tolerance range.

According to at least one embodiment, the action includes open-loop control, closed-loop control, braking, acceleration, or stopping of the motor. For example, the closed-loop control may include position control, speed control, acceleration control, or torque control. At least in the case of such closed-loop controls, the drive system can be said to be a servo drive system.

According to at least one embodiment, the drive system comprises a monitoring unit, which is configured to monitor the one or more operations of the switch, on-load tap-changer, diverter switch, selector, double reversing change-over selector, reversing change-over selector, change-over selector, circuit breaker, on-load switch or disconnecting switch on the basis of the feedback signal. The monitoring comprises in particular a monitoring as to whether individual operations or parts thereof are carried out properly, in particular within predefined time windows.

According to at least one embodiment the control device comprises a control unit and a power section for open-loop-controlled or closed-loop-controlled power supply of the motor. The control unit is configured to control the power section depending on at least one desired value, in particular a desired position, speed, or acceleration value.

According to at least one embodiment, the power section is designed as a converter or servo converter or as an equivalent electronic, in particular fully electronic, unit for drive machines.

According to various embodiments, the control device contains all or part of the feedback system.

According to at least one embodiment, the feedback system is configured to determine a first value for the position of the drive shaft in accordance with a first method.

According to at least one embodiment, the value for the position of the drive shaft is a value for an absolute position of the drive shaft.

According to at least one embodiment, the value for the position of the drive shaft is an incremental value for a position of the drive shaft or a value for a relative position of the drive shaft.

According to at least one embodiment, the feedback system is configured to determine a rotor position of the motor and thus to determine a value for the position of the drive shaft depending on the rotor position.

According to at least one embodiment, the rotor position is an angular range in which a rotor of the motor is located, optionally combined with a number of complete rotations of the rotor.

Depending on the design, in particular the number of pole pairs, of the rotor, the position or absolute position of the motor shaft can thus be determined accurately to at least 180°, for example by the control device. By the reduction by means of one or more gear units the achievable accuracy of the position of the drive shaft is significantly greater. In this case, the evaluation by the control device corresponds to a virtual encoder function, so to speak. This combination is also referred to as a virtual encoder.

According to at least one embodiment, the feedback system includes an encoder which is an absolute encoder and which is configured and arranged to detect the absolute position of the drive shaft or an absolute position of another shaft that is connected to the drive shaft and to generate at least one output signal based on the detected position. The feedback system is configured to determine the value for the position of the drive shaft for the absolute position on the basis of the at least one output signal.

According to at least one embodiment, the encoder is directly or indirectly attached to the motor shaft, the drive shaft or a shaft coupled thereto.

According to at least one embodiment, the encoder has a first output for outputting the first value for the absolute position.

The expression "encoder" includes both devices that determine two values for the position in different ways, and devices that contain two separate encoders, at least one of which is an absolute encoder.

According to at least one embodiment, the encoder comprises an absolute encoder or a multi-turn encoder or a single-turn encoder.

According to at least one embodiment, the encoder is configured to detect the position of the drive shaft or the position of the further shaft on the basis of a first sampling method.

According to at least one embodiment, the sampling method includes an optical, a magnetic, a capacitive, a resistive, or an inductive sampling method.

According to at least one embodiment, the encoder is connected to the drive shaft, the motor shaft or the further shaft in an interlocked manner.

According to at least one embodiment, the encoder is additionally connected to the drive shaft, the motor shaft or the further shaft in a frictionally engaged or integrally bonded manner, for example by means of an adhesive connection.

The interlocked and additional integrally bonded or frictionally engaged connection further increases the attachment of the encoder and ultimately the operational reliability.

According to a further embodiment, the feedback system is configured to determine at least one value for a position of the drive shaft by means of an encoder and an auxiliary contact and to generate a feedback signal based on the at least one value. In this case, the encoder and the auxiliary contact may each generate a separate value, wherein the values are then combined to form one value in order to generate a feedback signal based on this value. Furthermore, the particular value of the encoder and the value of the auxiliary contact, which in combination replicate the position of the drive shaft, directly generate a common feedback signal.

The drive system has a control device, which is configured to act on the operation of the motor depending on the feedback signal, which is based on a common value of the encoder and of the auxiliary contact or the individual values thereof.

By means of the determination of two values, on the basis of which the position of the drive shaft is determined, the inventive idea can be implemented with a very wide range of hardware. Ultimately, the operational reliability of the drive system, of the switch, and of the equipment is thus increased.

According to at least one embodiment, the feedback system is configured to determine a first value by the encoder in accordance with a first method and to determine the at least second values by the auxiliary contact in accordance with a second method. The values are then combined to form one value.

The methods can be distinguished by different technical or physical principles or different component parts (hardware components).

According to at least one embodiment, the first value of the encoder for the position of the drive shaft is a first value for an absolute position of the drive shaft.

According to at least one embodiment, the second value of the auxiliary contact for the position of the drive shaft is a second value for a relative position of the drive shaft.

The first and the second value may form a value for the absolute position of the drive shaft.

According to at least one embodiment, the feedback system is designed to determine a rotor position of the motor and to determine one of the at least two values for the position of the drive shaft depending on the rotor position. In this case, the feedback system is an encoder which is what is known as a virtual encoder.

According to at least one embodiment, the feedback system includes an encoder and an auxiliary contact which are configured and arranged to detect, in combination, the absolute position of the drive shaft or an absolute position of a further shaft connected to the drive shaft and to generate at least one output signal based on the detected position.

According to at least one embodiment, the encoder and the auxiliary contact are directly or indirectly attached to the motor shaft, the drive shaft, or a shaft coupled thereto.

According to at least one embodiment, the encoder has a first output for outputting the first value, and the auxiliary contact has a second output for outputting the second value, wherein the values form the absolute position of the drive shaft.

According to at least one embodiment, the auxiliary contact is configured to detect the position of the drive shaft or the position of the further shaft additionally on the basis of a sampling method.

According to at least one embodiment, the sampling method includes a mechanical, an optical, a magnetic, a capacitive, a resistive, or an inductive sampling method.

According to at least one embodiment, the auxiliary switch is additionally connected to the drive shaft, the motor shaft, or the further shaft in a frictionally engaged or integrally bonded manner, for example by means of an adhesive connection.

The interlocked and additional integrally bonded or frictionally engaged connection further increases the attachment of the auxiliary switch and ultimately the operational reliability.

According to the improved concept, a method for driving a, on-load tap-changer is also disclosed. The method comprises determining at least one value for an absolute position of a drive shaft for driving the on-load tap-changer, generating a feedback signal based on the at least one value, and controlling a motor for driving the on-load tap-changer depending on the feedback signal.

Further embodiments and implementations of the method are evident from the various embodiments of the tap changer assembly. In particular, individual components or a plurality of the components and/or assemblies described in relation to the tap changer assembly can be implemented to carry out the method accordingly.

In the following, aspects of the present invention is explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

The figures illustrate exemplary embodiments of the present invention without, however, limiting the invention to the illustrated exemplary embodiments.

FIG. 1 shows a schematic representation of an exemplary embodiment of a drive system 3 for a switch 1. The drive system 3 is connected to the switch 1 via a drive shaft 16. The drive system 3 includes a motor 12, which can drive the drive shaft 16 via a motor shaft 14 and, optionally, via a gear unit 15. A control device 2 of the drive system 3 comprises a power section 11, which contains for example a converter, for the open-loop- or closed-loop-controlled power supply of the motor 12, and a control unit 10 for controlling the power section 11, for example via a bus 18. The drive system 3 comprises an encoder 13, which serves as a feedback system 4, or is a part of the feedback system 4, and is connected to the power section 11. Furthermore, the encoder 13 is directly or indirectly coupled to the drive shaft 16.

The encoder 13 is configured to detect at least a first value for a position, in particular an angular position, for example an absolute angular position, of the drive shaft 16. For this purpose, the encoder 13 can comprise, for example, an absolute encoder, in particular a multi-turn absolute encoder, which is attached to the drive shaft 16, the motor shaft 14 or another shaft of which the position is unambiguously linked to the absolute position of the drive shaft 16. For example, the position of the drive shaft 16 can be unambiguously determined from the position of the motor shaft 14, for example via a transmission ratio of the gear unit.

The feedback system 4 is configured to detect a value for the position of the drive shaft 16.

The control device 2, in particular the control unit 10 and/or the power section 11, is configured to control the motor 12 in an open-loop or closed-loop fashion depending on a feedback signal generated by the feedback system 4, based on the value.

Figure 2:
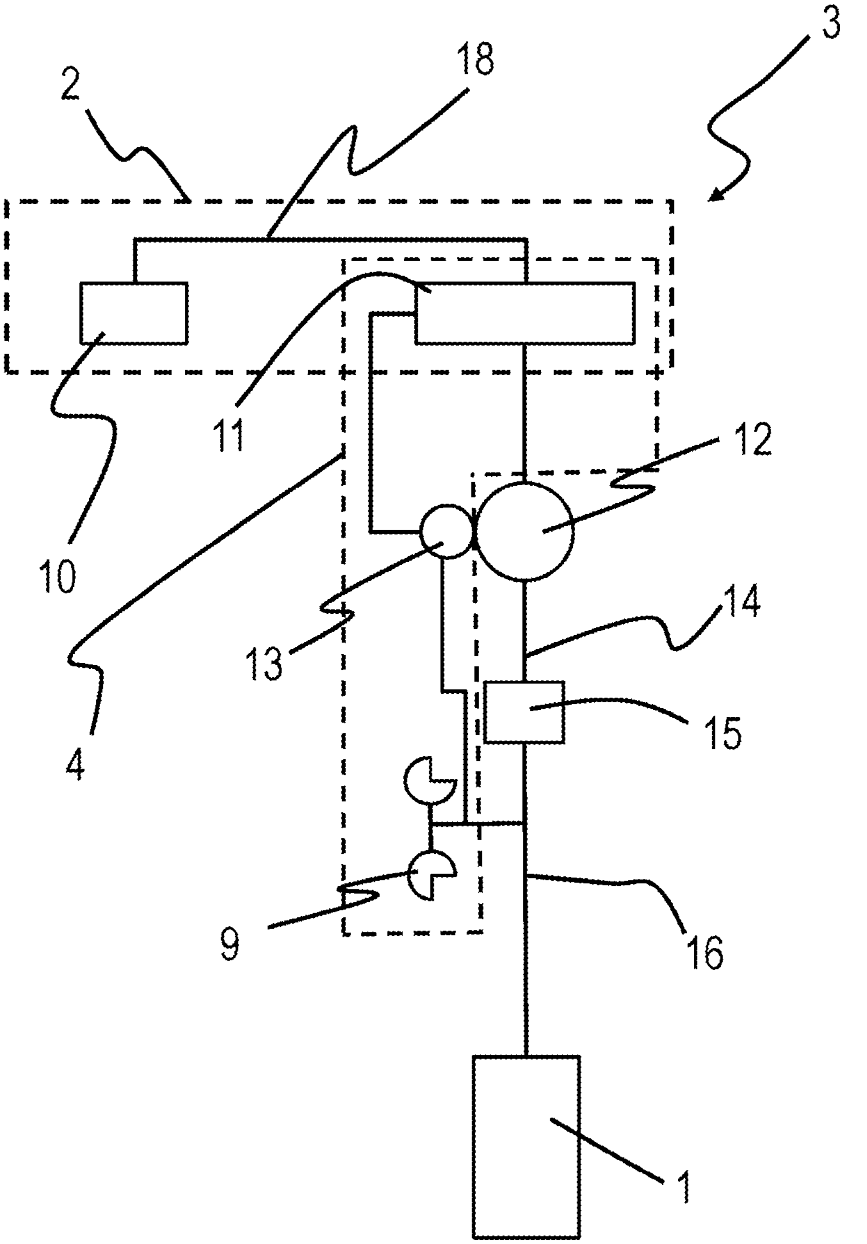
FIG. 2 a schematic representation of a further exemplary embodiment of a drive system according to the improved concept.

FIG. 2 shows a further schematic representation of an exemplary embodiment of a drive system 3. Here, in addition to the encoder 13, which is designed as an absolute encoder, multi-turn absolute encoder, single-turn absolute encoder or single-turn encoder, or incremental encoder or virtual encoder, an auxiliary switch 9 can be provided. The drive system 3 thus has an encoder 13 and an auxiliary switch 9, which serve as a feedback system 4, or are part of the feedback system 4, and are connected to the power section 11.

The auxiliary switch 9 can be designed as at least one microswitch or a resolver or a sin-cos encoder. The position of the drive shaft 16 can be unambiguously determined by means of the encoder 13 in conjunction with the auxiliary switch 9.

Alternatively or additionally, the control device 2 can be configured to determine a value for the position of the drive shaft 16 from a rotor position of the motor 12. In this case, it would be the encoder 13 already mentioned, which is designed as a virtual encoder.

For this purpose, for example, an inductive feedback may be utilized by the movement of the rotor in motor windings of the motor 12. Since a strength of the feedback varies periodically, signal analysis, for example fast Fourier transform (FFT) analysis, can be used to approximate the rotor position in particular. Since one full revolution of the drive shaft 16 corresponds to a plurality of revolutions of the rotor, the position of the drive shaft 16 can be inferred therefrom with much higher accuracy. In addition, an auxiliary switch 9 can supplement the determination of the position of the drive shaft 16.

The control device 2, in particular the control unit 10 and/or the power section 11, is configured to control the motor 12 in an open-loop or closed-loop fashion depending on a feedback signal generated by the feedback system 4, based on the first value. Depending on the embodiments, the value is generated by an output signal of an encoder 13 or by an output signal of an encoder 13 in conjunction with an auxiliary switch 9.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Switch
2 Control device
3 Drive system
4 Feedback system
9 Auxiliary contact
10 Control unit
11 Power section
12 Motor
13 Encoder
14 Motor shaft
15 Gear unit
16 Drive shaft
18 Bus

The invention claimed is:

1. A drive system for driving a switch, the drive system comprising:

a drive shaft configured to connect the drive system to the switch;

a motor having a motor shaft, the motor shaft configured to drive the drive shaft;

a feedback system, the feedback system comprising an incremental encoder and a microswitch, which in combination are configured and arranged to:

detect an absolute position of the drive shaft or an absolute position of a further shaft connected to the drive shaft; and generate at least one first output signal based on the detected absolute position of the drive shaft or the detected absolute position of the further shaft, and the feedback system being configured to:

determine at least one value for the absolute position of the drive shaft based on the at least one first output signal; and generate a feedback signal based on the at least one value for the absolute position of the drive shaft; and a controller configured to act on an operation of the motor based on the feedback signal, wherein the microswitch is directly attached to the drive shaft, and wherein the incremental encoder is directly attached to the motor shaft.

2. The drive system as claimed in claim 1, wherein the switch is an on-load tap-changer, or a diverter switch, or a load selector, or a selector, or a reversing change-over selector, or a double reversing change-over selector, or a change-over selector, or a circuit breaker, or an on-load switch, or a disconnecting switch.

3. The drive system as in claim 1, wherein the incremental encoder is configured to output a first signal and the microswitch is configured to output a second signal, and wherein the feedback system is configured to combine the first signal and the second signal to provide the at least one first output signal.

4. The drive system as in claim 1, wherein the driveshaft is connected directly or indirectly, via one or more gear units, to the motor shaft.

5. The drive system as in claim 1, wherein the incremental encoder is connected to the drive shaft in a frictionally engaged or incrementally bonded manner.

6. The drive system as in claim 1, wherein the microswitch is connected to the motor shaft in a frictionally engaged or incrementally bonded manner.

7. The drive system as in claim 1, wherein the controller is further configured to control the motor in an open-loop or closed-loop fashion, depending on the feedback signal generated by the feedback system.

8. The drive system as in claim 1, wherein the feedback system further comprises the incremental encoder and a plurality of microswitches, which in combination are configured and arranged to:

detect an absolute position of the drive shaft or an absolute position of a further shaft connected to the drive shaft; and generate at least one first output signal based on the detected absolute position of the drive shaft or the detected absolute position of the further shaft, and wherein the plurality of microswitches comprises the microswitch.

9. A method for driving a switch by a drive system, the drive system comprising: a drive shaft connecting the drive system to the switch; a motor having a motor shaft, the motor shaft configured to drive the drive shaft a feedback system comprising an incremental encoder directly attached to the motor shaft and a microswitch directly attached to the drive shaft, the method comprising:

using the incremental encoder in combination with the microswitch to:

detect an absolute position of the drive shaft or an absolute position of a further shaft connected to the drive shaft; and generate at least one first output signal based on the detected absolute position of the drive shaft or the detected absolute position of the further shaft determining at least one value for the absolute position of the drive shaft based on the at least one first output signal;

generating a feedback signal based on the at least one value for the absolute position of the drive shaft; and controlling the motor for driving the switch based upon the feedback signal.

* * * * *